H. OLSON.
Corn-Planters.
No. 154,515. Patented Aug. 25, 1874.
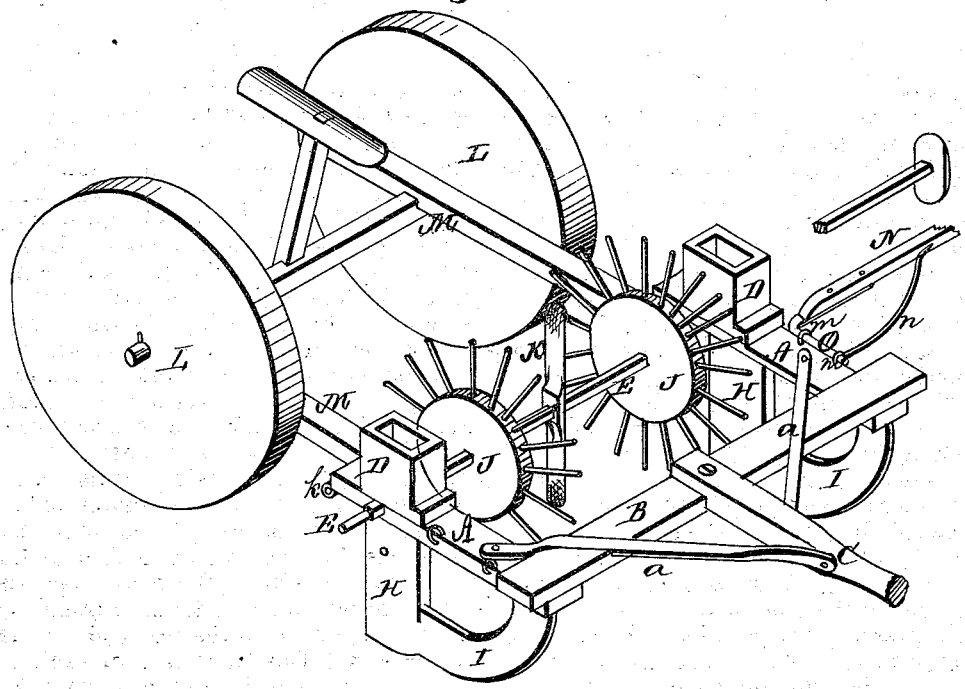
Fig. 1
Fig. 2
WITNESSES
Franck L. Durand
C. L. Evert
INVENTOR
Holcom Olson
per
Alexander Truston
Attorneys
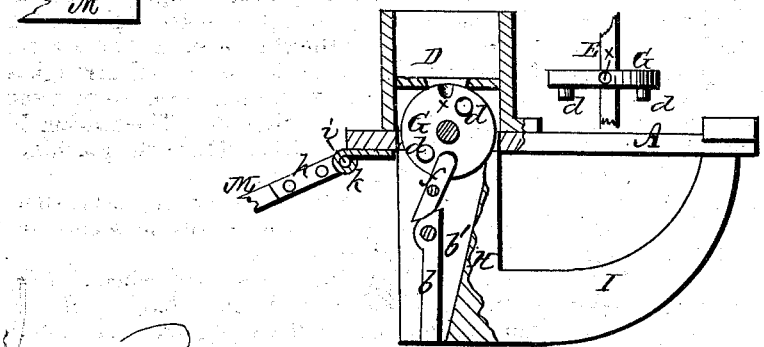

UNITED STATES PATENT OFFICE.

HOLCOM OLSON, OF SNEESBURG, IOWA.

IMPROVEMENT IN CORN-PLANTERS.

Specification forming part of Letters Patent No. 154,515, dated August 25, 1874; application filed July 3, 1874.

*To all whom it may concern:*

Be it known that I, HOLCOM OLSON, of Sneesburg, in the county of Henry and in the State of Iowa, have invented certain new and useful Improvements in Corn-Planter; and do hereby declare that the following is a full, clear, and exact description thereof, reference being had to the accompanying drawings, and to the letters of reference marked thereon, making a part of this specification.

The nature of my invention consists in the construction and arrangement of a corn-planter, as will be hereinafter more fully set forth.

In order to enable others skilled in the art to which my invention appertains to make and use the same, I will now proceed to describe its construction and operation, referring to the annexed drawing, in which—

Figure 1 is a perspective view of my corn-planter, and Fig. 2 is a vertical section through one of the seed-boxes.

A A represent two parallel side beams or bars, connected at their front ends by a cross-bar, B, to which the tongue C is attached, said tongue being braced to the cross-bar and side beams by inclined or diagonal braces $a\ a$, as shown. On top of each side beam A is secured a seed-box, D, and through the bottoms thereof passes a shaft, E, which is provided within each box with a dropping-wheel, G. This wheel works in a slot or mortise in the beam A, and is, in its circumference, provided with two seed-cups, $x\ x$, opposite each other, and on one side of the wheel project two pins, $d\ d$. On the under side of each beam A is secured the conductor H, provided with the runner I, extending from the lower end of the conductor to the front end of the beam. Inside of the conductor H is hung a drop-bar, $b$, which hangs vertically downward of its own gravity, and forms between it and the front part of the conductor a V-shaped chamber or channel, $b'$, closed at its lower end, to receive and retain the corn deposited therein from the seed-cups $x$ by the revolution of the wheel G. The upper end of the drop-bar $b$ is cam-shaped, as shown in Fig. 2; and above said end of the drop-bar is pivoted another bar, $f$, which is acted upon by each pin $d$ on the wheel G as it revolves, so that its lower end will act upon the cam-surface of the bar $b$, and turn said bar on its pivot to open the lower end of the chamber $b'$, and allow the corn in said chamber to drop down into the furrow made by the runner I. As soon as the pin $d$ clears the upper end of the bar $f$, the drop-bar $b$ will fall down and close the lower end of the chamber $b'$ by its own gravity, so as to retain the next lot of corn dropped therein until the other pin comes around to strike the bar $f$. Upon the shaft E, between the two seed-boxes, are secured two spoke-wheels, J J, to run on and catch in the ground, so as to revolve the shaft and dropping-wheels. Between the two wheels J, on the shaft, is secured a check-bar, K, the ends of which are beveled, to also enter the ground. This bar forms a pointer, to indicate the location of the corn, or the hills, it being set so as to strike the ground on a line between the two hills. The corn is covered by large wheels L L, mounted in a frame, M, and this frame hinged to the rear ends of the side beams A A. The frame M is, on each side, at the front end, provided with a plate, $h$, from which projects a rod, $i$, and this rod is passed through a tube, $k$, formed on a metal plate attached to the under side of the side beam A, at the rear end. N represents the marker, having an angle-iron, O, attached to its inner end, said iron forming a right angle, as shown. The end of this iron is passed through two (or more) eyes, $m$, on the side-beam A, and a wire, $n$, fastened to the marker is passed through a hole in the end of said angle-iron, to prevent the marker from coming out. The marker N may be changed to either side of the machine, as may be required for use.

Having thus fully described my invention, what I claim as new, and desire to secure by Letters Patent, is—

The combination of the drop-wheels G G, spoke-wheels J J, and check-bar K, all arranged upon the shaft E, substantially as and for the purposes herein set forth.

In testimony that I claim the foregoing I have hereunto set my hand this 17th day of June, 1874.

HOLCOM OLSON.

Witnesses:
J. W. HAMPTON,
P. LILIEDAHL.